United States Patent
Kitahira et al.

(10) Patent No.: US 8,570,428 B2
(45) Date of Patent: Oct. 29, 2013

(54) CAMERA SYSTEM HAVING AUTOFOCUS FUNCTION FOR CAPTURING A MOVING IMAGE

(75) Inventors: Naotake Kitahira, Osaka (JP); Mitsuyoshi Okamoto, Osaka (JP); Kenji Kawazoe, Hyogo (JP); Koji Shibuno, Osaka (JP)

(73) Assignee: Panasonic Corporation, Osaka (JP)

( * ) Notice: Subject to any disclaimer, the term of this patent is extended or adjusted under 35 U.S.C. 154(b) by 29 days.

(21) Appl. No.: 12/992,790

(22) PCT Filed: May 15, 2009

(86) PCT No.: PCT/JP2009/002151
§ 371 (c)(1),
(2), (4) Date: Nov. 15, 2010

(87) PCT Pub. No.: WO2009/139186
PCT Pub. Date: Nov. 19, 2009

(65) Prior Publication Data
US 2011/0063472 A1  Mar. 17, 2011

Related U.S. Application Data

(60) Provisional application No. 61/053,815, filed on May 16, 2008.

(30) Foreign Application Priority Data

May 30, 2008 (JP) ................................ 2008-141928

(51) Int. Cl.
*H04N 5/232* (2006.01)
(52) U.S. Cl.
USPC ....................................... 348/345; 348/222.1
(58) Field of Classification Search
USPC ................................ 348/222.1, 345, 347, 220.1
See application file for complete search history.

(56) References Cited

U.S. PATENT DOCUMENTS

| 4,783,677 | A | * | 11/1988 | Hamada et al. | 396/95 |
| 5,387,960 | A | * | 2/1995 | Hirasawa et al. | 396/135 |
| 5,648,836 | A | * | 7/1997 | Sato et al. | 396/86 |
| 6,094,223 | A | | 7/2000 | Kobayashi | |

(Continued)

FOREIGN PATENT DOCUMENTS

JP  5-236326  9/1993

(Continued)

OTHER PUBLICATIONS

International Search Report of PCT Application No. PCT/JP2009/002151 dated Jul. 14, 2009.

(Continued)

*Primary Examiner* — James M Hannett
*Assistant Examiner* — Fayez Bhuiyan
(74) *Attorney, Agent, or Firm* — Panasonic Patent Center

(57) ABSTRACT

A camera system includes a camera body (100) and an interchangeable lens (200). The camera body includes an imaging unit that captures a subject image formed by the interchangeable lens in a predetermined capturing cycle to generate image data, a body controller that generates a synchronizing signal having a first cycle correlated with the capturing cycle, and a sending unit that sends the generated synchronizing signal to the interchangeable lens. The body controller further sends information indicating a second cycle different from the first cycle to the interchangeable lens. The interchangeable lens includes a focus lens (230), a drive unit (233) that drives the focus lens along an optical axis, a receiving unit (250) that receives the synchronizing signal and the information indicating the second cycle sent from the camera body, and a lens controller (240) that controls an operation of the interchangeable lens. The lens controller controls the drive unit to perform, in the second cycle, a minute back and forth driving which minutely moves the focus lens back and forth along the optical axis, and performs other control in the first cycle in the interchangeable lens than the control of the minute back and forth driving.

12 Claims, 6 Drawing Sheets

(56) References Cited

U.S. PATENT DOCUMENTS

| | | | |
|---|---|---|---|
| 6,363,220 B1* | 3/2002 | Ide | 396/98 |
| 2002/0044206 A1* | 4/2002 | Kyuma et al. | 348/240 |
| 2002/0047912 A1 | 4/2002 | Mabuchi et al. | |
| 2002/0075395 A1 | 6/2002 | Ohkawara | |
| 2007/0086778 A1* | 4/2007 | Tanaka | 396/529 |
| 2007/0140681 A1* | 6/2007 | Tanaka | 396/279 |
| 2007/0273783 A1 | 11/2007 | Okazaki et al. | |
| 2008/0007644 A1 | 1/2008 | Matsumoto | |
| 2008/0031611 A1* | 2/2008 | Konishi | 396/102 |
| 2008/0199170 A1 | 8/2008 | Shibuno et al. | |
| 2011/0044682 A1 | 2/2011 | Kawanami | |

FOREIGN PATENT DOCUMENTS

| | | |
|---|---|---|
| JP | 08-129199 | 5/1996 |
| JP | 11-052220 | 2/1999 |
| JP | 11-155094 | 6/1999 |
| JP | 2005-252436 | 9/2005 |
| JP | 2006-065176 | 3/2006 |
| JP | 2006-208897 | 8/2006 |
| JP | 2007-322922 | 12/2007 |
| JP | 2008-015274 | 1/2008 |

OTHER PUBLICATIONS

Translation of International Preliminary Report on Patentability (PCT/IB1338) mailed on Jan. 20, 2011 with PCT/IB/373 & PCT/ISA/237 for corresponding application PCT/JP2009/002151.

The Extended European Search Report, Application No. EP 09 74 6393, dated on Oct. 7, 2011.

* cited by examiner

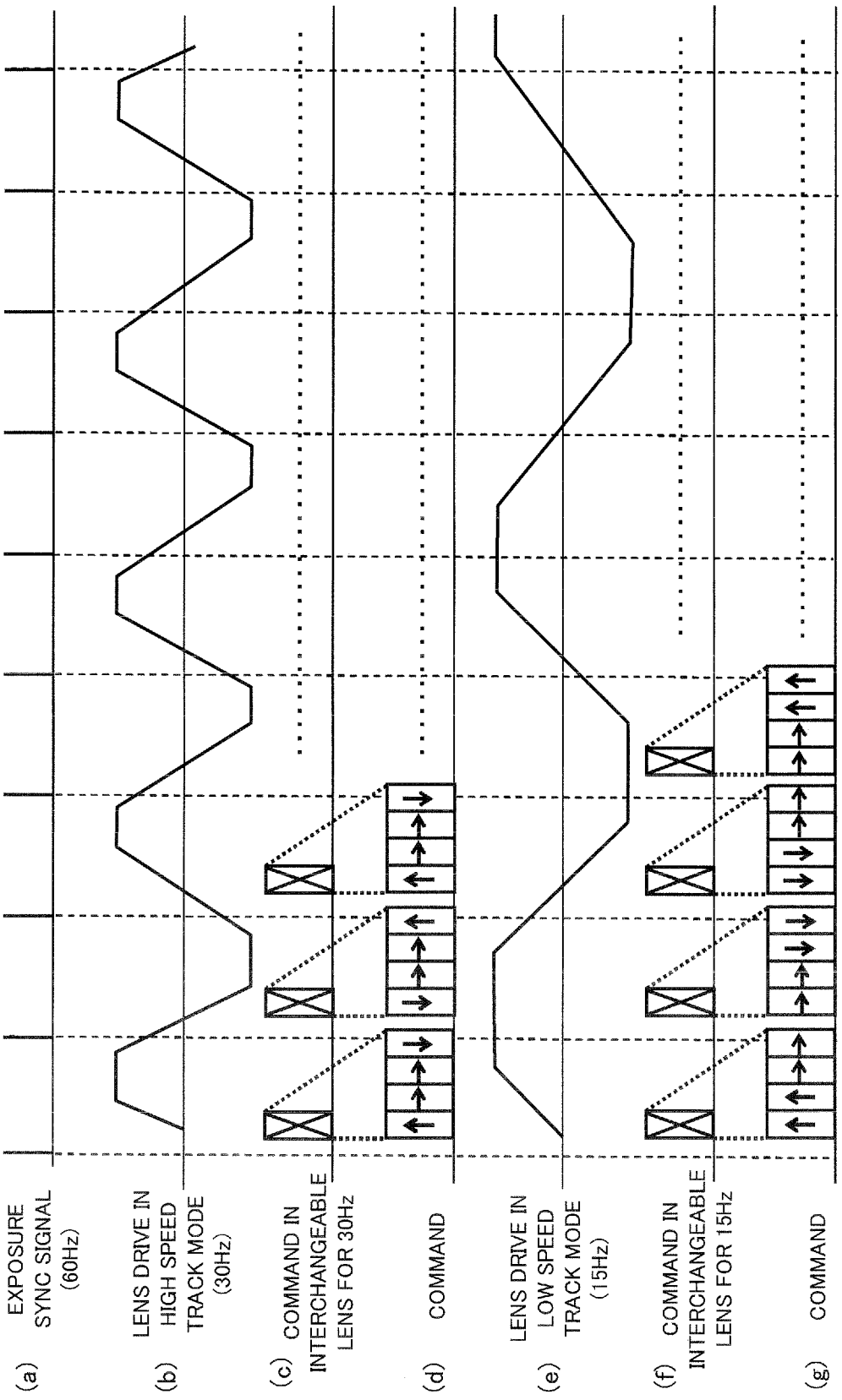

Fig. 6

| BIT | FLAG | VALUE |
|---|---|---|
| 1 | 30Hz CONTROL FREQUENCY SUPPORT FLAG | SUPPORTED=1, NOT SUPPORTED=0 |
| 2 | 60Hz CONTROL FREQUENCY SUPPORT FLAG | SUPPORTED=1, NOT SUPPORTED=0 |
| 3 | 120Hz CONTROL FREQUENCY SUPPORT FLAG | SUPPORTED=1, NOT SUPPORTED=0 |
| 4 | 240Hz CONTROL FREQUENCY SUPPORT FLAG | SUPPORTED=1, NOT SUPPORTED=0 |
| 5 | 25Hz CONTROL FREQUENCY SUPPORT FLAG | SUPPORTED=1, NOT SUPPORTED=0 |
| 6 | 50Hz CONTROL FREQUENCY SUPPORT FLAG | SUPPORTED=1, NOT SUPPORTED=0 |
| 7 | 100Hz CONTROL FREQUENCY SUPPORT FLAG | SUPPORTED=1, NOT SUPPORTED=0 |
| 8 | 200Hz CONTROL FREQUENCY SUPPORT FLAG | SUPPORTED=1, NOT SUPPORTED=0 |
| 9 | 24Hz CONTROL FREQUENCY SUPPORT FLAG | SUPPORTED=1, NOT SUPPORTED=0 |
| 10 | 48Hz CONTROL FREQUENCY SUPPORT FLAG | SUPPORTED=1, NOT SUPPORTED=0 |
| 11 | 96Hz CONTROL FREQUENCY SUPPORT FLAG | SUPPORTED=1, NOT SUPPORTED=0 |
| 12 | 192Hz CONTROL FREQUENCY SUPPORT FLAG | SUPPORTED=1, NOT SUPPORTED=0 |
| 13 | 1/2 WOBLING FREQUENCY SUPPORT FLAG | SUPPORTED=1, NOT SUPPORTED=0 |
| 14 | 1/4 WOBLING FREQUENCY SUPPORT FLAG | SUPPORTED=1, NOT SUPPORTED=0 |
| 15 | 1/8 WOBLING FREQUENCY SUPPORT FLAG | SUPPORTED=1, NOT SUPPORTED=0 |

CAMERA SYSTEM HAVING AUTOFOCUS FUNCTION FOR CAPTURING A MOVING IMAGE

TECHNICAL FIELD

The present invention relates to a camera system and more particularly to a camera system including an interchangeable lens and a camera body.

BACKGROUND ART

Patent Document 1 discloses a camera system configured by a camera body and an interchangeable lens. The camera system performs autofocus control upon capturing a still image, by sending an instruction to control drive of the interchangeable lens from the camera body to the interchangeable lens while synchronizing operation between the camera body and the interchangeable lens.

PRIOR ART DOCUMENTS

Patent Documents

Patent Document 1: JP 2007-322922 A

DISCLOSURE OF INVENTION

Problems to be Solved by the Invention

A camera system has a through-image display function that displays an image captured by an imaging device thereof on a liquid crystal display provided on a back of a camera body. By seeing the through image, a user can determine a composition of a subject upon shooting a still image. In addition, upon capturing a moving image, an image being captured is displayed on the liquid crystal display.

Upon displaying a through image or capturing a moving image, it needs to perform control in which operations between the camera body and the interchangeable lens is synchronized. For example, to display an image on the liquid crystal display, an autofocus operation is required. In the autofocus operation, a focus lens is minutely driven back and forth along an optical axis. Therefore, the camera body needs to control the interchangeable lens to control finely a lens operation (wobbling control).

Therefore, in synchronous control between the camera body and the interchangeable lens, appropriate control taking into account a wobbling operation of the focus lens is required.

Patent Document 1 does not disclose at all how to synchronize operations between the camera body and the interchangeable lens upon displaying a through image or capturing a moving image.

An object of the present invention is to provide a camera system capable of controlling a wobbling operation of a focus lens at a frequency appropriate for wobbling while synchronizing operation between a camera body and an interchangeable lens by using a synchronizing signal with a predetermined frequency upon generating a through image or capturing a moving image.

Means for Solving the Problems

In a first aspect, a camera system including a camera body and an interchangeable lens is provided. The camera body includes an imaging unit that captures a subject image formed by the interchangeable lens in a predetermined capturing cycle to generate image data, a body controller that generates a synchronizing signal having a first cycle correlated with the capturing cycle, and a sending unit that sends the generated synchronizing signal to the interchangeable lens. The body controller further sends information indicating a second cycle different from the first cycle to the interchangeable lens through the sending unit. The interchangeable lens includes a focus lens, a drive unit that drives the focus lens along an optical axis, a receiving unit that receives the synchronizing signal and the information indicating the second cycle which are sent from the camera body, and a lens controller that controls an operation of the interchangeable lens. The lens controller controls the drive unit to perform, in the second cycle, a minute back and forth driving which minutely moves the focus lens back and forth along the optical axis, and performs other control in the first cycle in the interchangeable lens than the control of the minute back and forth driving.

In a second aspect, a camera system including a camera body and an interchangeable lens is provided. The camera body includes an imaging unit that captures a subject image formed by the interchangeable lens in a predetermined capturing cycle to generate image data, a body controller that generates a first synchronizing signal having a first cycle correlated with the capturing cycle, and a sending unit that sends the generated synchronizing signal to the interchangeable lens. The body controller further generates a second synchronizing signal having a second cycle and sends the second synchronizing signal to the interchangeable lens. The interchangeable lens includes a focus lens, a drive unit that drives the focus lens along an optical axis, a receiving unit that receives the first and the second synchronizing signals sent from the camera body, and a lens controller that controls an operation of the interchangeable lens. The lens controller controls the drive unit to perform, in the second cycle, a minute back and forth driving which minutely moves a position of the focus lens back and forth along the optical axis, and performs other control in the first cycle in the interchangeable lens than the control of the minute back and forth driving.

In a third aspect, a camera body to which an interchangeable lens is attachable is provided. The camera body includes an imaging unit that captures a subject image formed by the interchangeable lens in a predetermined capturing cycle to generate image data, a body controller that generates a synchronizing signal having a first cycle correlated with the capturing cycle, and a sending unit that sends the generated synchronizing signal to the interchangeable lens. The body controller further sends information indicating a second cycle to the interchangeable lens through the sending unit, the second cycle being a cycle used to minutely move the focus lens back and forth along an optical axis and being different from the first cycle.

In a fourth aspect, an interchangeable lens mountable to a camera body is provided. The interchangeable lens includes a focus lens, a drive unit that drives the focus lens along an optical axis, a receiving unit that receives a synchronizing signal having a first cycle and information indicating a second cycle different from the first cycle, which are sent from the camera body, and a lens controller that controls an operation of the interchangeable lens. The lens controller controls the drive unit to perform, in the second cycle, a minute back and forth driving which minutely moves the focus lens back and forth along the optical axis, and performs other control in the first cycle in the interchangeable lens than the control of the minute back and forth driving.

Effect of the Invention

According to the present invention, there can be provided a camera system that is capable of controlling a wobbling operation of a focus lens at a frequency appropriate for wobbling, while synchronizing operation between a camera body and an interchangeable lens by using a synchronizing signal with a predetermined frequency, upon generating a through image or capturing a moving image.

BRIEF DESCRIPTION OF DRAWINGS

FIG. 5 is a timing chart for describing a synchronous state.

FIG. 6 is a diagram showing an example of information indicating control frequencies and wobbling frequencies which are supportable by an interchangeable lens.

BEST MODE FOR CARRYING OUT THE INVENTION

1. First Embodiment 1-1. Configuration
1-1-1. Overview

Figure 1:
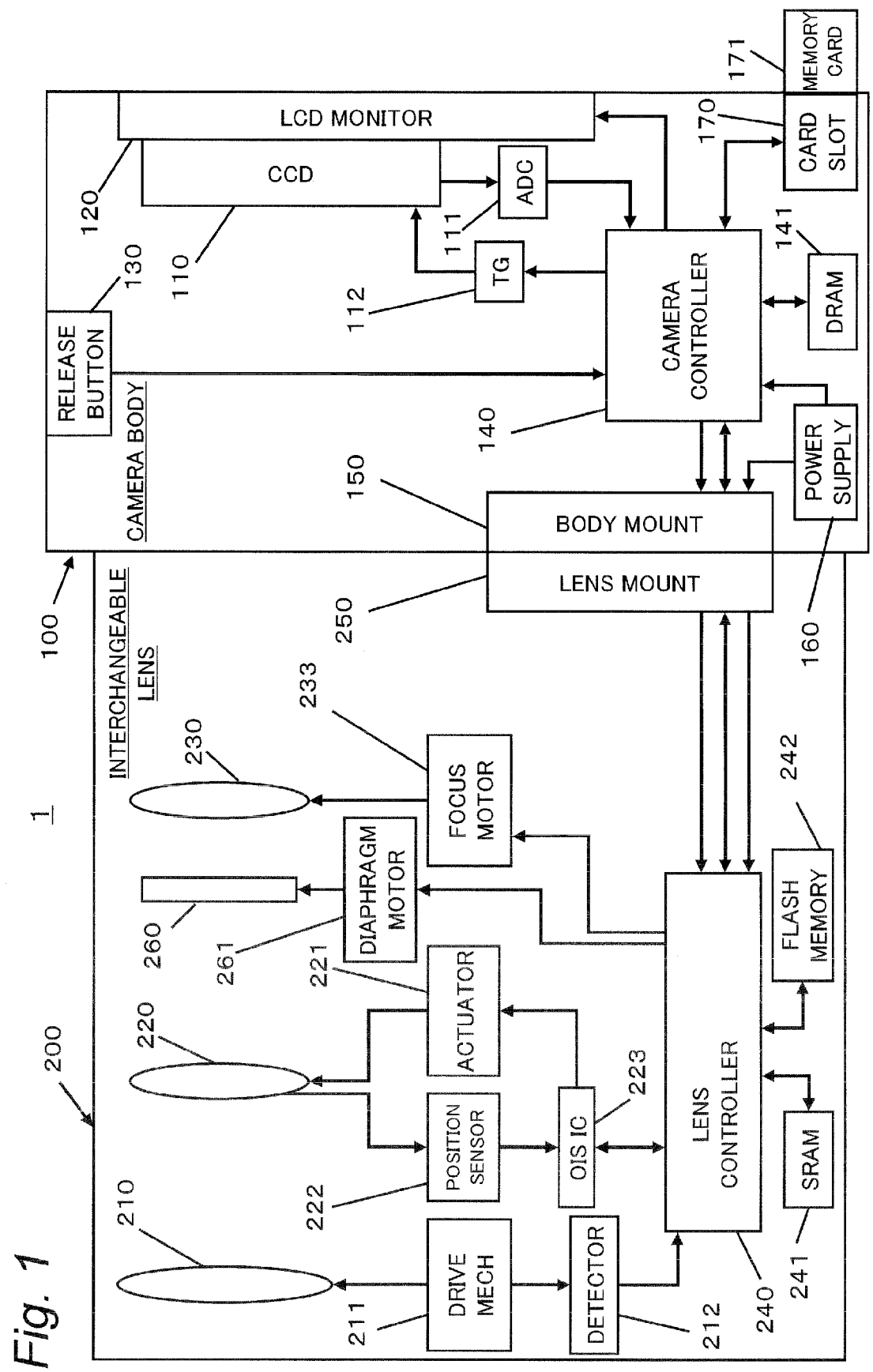
FIG. 1 is a block diagram of a camera system according to a first embodiment.

FIG. 1 is a block diagram showing a configuration of a camera system according to a first embodiment. A camera system 1 is configured by a camera body 100 and an interchangeable lens 200 mountable to the camera body 100. The camera system 1 can generate moving-image data by periodically capturing image data with a CCD image sensor 110. The present invention is an invention related to a lens interchangeable type camera system. More particularly, the present invention is an invention provided to accurately synchronize operations between the camera body and the interchangeable lens upon generating a through image or capturing a moving image.

1-1-2. Configuration of Camera Body

The camera body 100 includes the CCD image sensor 110, a liquid crystal display monitor 120, a camera controller 140, a body mount 150, a power supply 160, and a card slot 170.

The camera controller 140 controls the entire camera system 1, such as the CCD image sensor 110, according to an instruction from an operation member such as a release button 130. The camera controller 140 sends a vertical synchronizing signal to a timing generator 112. In parallel with this, the camera controller 140 generates an exposure synchronizing signal based on the vertical synchronizing signal. The camera controller 140 periodically and repeatedly sends the generated exposure synchronizing signal to a lens controller 240 through the body mount 150 and a lens mount 250. The camera controller 140 uses a DRAM 141 as a work memory when performing a control operation or image processing operation.

The CCD image sensor 110 captures a subject image incident thereon through the interchangeable lens 200 to generate image data. The generated image data is digitized by an AD converter 111. The image data digitized by the AD converter 111 is subjected to various image processing by the camera controller 140. The various image processing as used herein includes, for example, a gamma correction process, a white balance correction process, a flaw correction process, a YC conversion process, an electronic zoom process, and an image compression process such as a JPEG compression process.

The CCD image sensor 110 operates at timing controlled by the timing generator 112. The operations of the CCD image sensor 110 include a still image capturing operation, a moving image capturing operation, a through image capturing operation, and the like. In this case, a through image is an image that is not recorded in a memory card 171 after being captured. The through image is mainly a moving image and is displayed on the liquid crystal display monitor 120 to allow a user to determine a composition for capturing a still image.

The liquid crystal display monitor 120 displays an image represented by display image data having been subjected to image processing by the camera controller 140. The liquid crystal display monitor 120 can selectively display both moving image and still image.

The card slot 170 allows the memory card 171 to be inserted therein. The card slot 170 controls the memory card 171 based on control of the camera controller 140. The memory card 171 can store image data generated by image processing by the camera controller 140. For example, the memory card 171 can store JPEG image files. In addition, the memory card 171 can output image data or an image file stored therein. The image data or image file outputted from the memory card 171 is subjected to image processing by the camera controller 140. For example, the camera controller 140 expands image data or an image file obtained from the memory card 171 and thereby generates display image data.

The power supply 160 supplies power to be consumed by the camera system 1. The power supply 160 may be, for example, a dry battery or rechargeable battery. Alternatively, the power supply 160 may supply power supplied from an external source through a power cord, to the camera system 1.

The body mount 150 can be mechanically and electrically connected to the lens mount 250 of the interchangeable lens 200. The body mount 150 can send/receive data to/from the interchangeable lens 200 through the lens mount 250. The body mount 150 sends an exposure synchronizing signal received from the camera controller 140, to the lens controller 240 through the lens mount 250. The body mount 150 sends other control signals received from the camera controller 140, to the lens controller 240 through the lens mount 250. For example, the body mount 150 sends information about the drive of the focus lens 230 which is received from the camera controller 140, to the lens controller 240 through the lens mount 250. The body mount 150 also sends signals received from the lens controller 240 through the lens mount 250, to the camera controller 140. In addition, the body mount 150 supplies power received from the power supply 160, to the entire interchangeable lens 200 through the lens mount 250.

1-1-3. Configuration of Interchangeable Lens

The interchangeable lens 200 includes an optical system, the lens controller 240, and the lens mount 250. The optical system of the interchangeable lens 200 includes a zoom lens 210, an GIS lens 220, a diaphragm 260, and a focus lens 230.

The zoom lens 210 is a lens for changing a magnification of a subject image formed by the optical system of the interchangeable lens 200. The zoom lens 210 is configured by one or a plurality of lenses. A drive mechanism 211 includes a zoom ring operable by the user, and the like, and transmits an operation performed by the user to the zoom lens 210 to cause the zoom lens 210 to move in an optical axis direction of the optical system. A detector 212 detects an amount of drive of the drive mechanism 211. The lens controller 240 obtains a detection result obtained by the detector 212 and can thereby grasp the zoom magnification of the optical system.

The OIS lens 220 is a lens for correcting shake of a subject image formed by the optical system of the interchangeable lens 200. The OIS lens 220 reduces shake of a subject image on the CCD image sensor 110 by moving in a direction in which a shake of the camera system 1 is cancelled. The OIS lens 220 is configured by one or a plurality of lenses. An actuator 221 under control of an OIS IC 223 drives the OIS lens 220 in a plane perpendicular to an optical axis of the optical system. The actuator 221 can be implemented by, for example, a magnet and a planar coil. A position detection sensor 222 is a sensor that detects a position of the OIS lens 220 in the plane perpendicular to the optical axis of the optical system. The position detection sensor 222 can be implemented by, for example, a magnet and a Hall element. The OIS IC 223 controls the actuator 221 based on a detection result obtained by the position detection sensor 222 and a detection result obtained by a camera shake sensor such as a gyro sensor. The OIS IC 223 obtains the detection result obtained by the camera shake sensor, from the lens controller 240. Moreover, the OIS IC 223 sends a signal indicating a state of an optical image blur correction process to the lens controller 240.

The diaphragm 260 is a member for regulating the amount of light passing through the optical system. The diaphragm 260 includes, for example, a plurality of diaphragm blades and can regulate the amount of light by opening and closing an opening formed by the blades. An diaphragm motor 261 is a drive unit for opening and closing the opening of the diaphragm 260.

The focus lens 230 is a lens for changing the focus state of a subject image formed on the CCD image sensor 110 by the optical system. The focus lens 230 is configured by one or a plurality of lenses.

A focus motor 233 drives the focus lens 230 to move back and forth along the optical axis of the optical system under control of the lens controller 240. Hence, the focus state of a subject image formed on the CCD image sensor 110 by the optical system can be changed. In the first embodiment, a stepping motor is used for the focus motor 233. However, it should be noted that the present invention is not limited thereto. The focus motor 233 can also be implemented by, for example, a DC motor, a linear motor, or an ultrasonic motor.

The lens controller 240 controls the entire interchangeable lens 200, such as the OIS IC 223 and the focus motor 233, based on control signals from the camera controller 140. For example, the lens controller 240 controls the focus motor 233 to cause the focus lens 230 to move back and forth along the optical axis by a predetermined drive method, based on a control signal from the camera controller 140.

In an autofocus operation, the lens controller 240 can perform wobbling control of the focus lens 230 in synchronization with an exposure synchronizing signal from the camera controller 140. In this case, the wobbling control of the focus lens 230 means to minutely drive the focus lens 230 back and forth on the optical axis. The minute back and forth driving is performed in a predetermined cycle. By making the focus lens 230 perform a wobbling operation, a moving subject can be continuously brought into focus. Particularly, in the camera system 1 of the present embodiment, the lens controller 240 can perform wobbling control of the focus lens 230 at a frequency different from a frequency of an exposure synchronizing signal obtained from the camera controller 140.

The lens controller 240 receives signals from the detector 212, the OIS IC 223, and the like, and sends the signals to the camera controller 140. The lens controller 240 performs sending and receiving of commands and data with the camera controller 140 through the lens mount 250 and the body mount 150.

The lens controller 240 uses a DRAM 241 as a work memory for control operation. A flash memory 242 stores a program and parameters used when the lens controller 240 performs control.

1-1-3-1. Information about Driving Frequency Stored in Interchangeable Lens

As described above, in the camera system 1 of the present embodiment, the lens controller 240 can perform wobbling control of the focus lens 230 at a frequency different from a frequency of an exposure synchronizing signal obtained from the camera controller 140. Hence, the flash memory 242 of the present embodiment stores information indicating a relationship between a frequency at which the lens controller 240 can drive the focus lens 230 to perform a wobbling operation and a frequency of an exposure synchronizing signal obtained from the camera controller 140. With this, a wobbling operation can be controlled at a frequency independent of those for other controls.

Specifically, the flash memory 242 stores information about a ratio of a frequency for a wobbling operation (hereinafter, referred to as the "wobbling frequency") which is controllable by the lens controller 240 to a frequency of an exposure synchronizing signal which is periodically obtained from the camera controller 140. The flash memory 242 further stores information about the frequency at which the lens controller 240 can make the focus lens 230 perform a wobbling operation.

For example, it is assumed that the camera controller 140 transmits an exposure synchronizing signal to the lens controller 240 at 60 Hz. In addition, it is assumed that the lens controller 240 can perform wobbling drive of the focus lens 230 at frequencies that are ½ and ¼ of the frequency of the exposure synchronizing signal. It is also assumed that the lens controller 240 can make the focus lens 230 perform a wobbling operation at 30 Hz and 15 Hz. In this case, the flash memory 242 stores information indicating that wobbling control can be performed at frequencies that are ½ and ¼ of the frequency of the exposure synchronizing signal. The flash memory 242 also stores information indicating that wobbling control of the focus lens 230 can be performed at 30 Hz and 15 Hz.

1-1-4. Term Correspondence

The camera controller 140 is an example of a body controller. The body mount 150 is an example of a sending unit. The lens mount 250 is an example of a receiving unit. The lens controller 240 is an example of a lens controller. The CCD image sensor 110 is an example of an imaging unit. The focus motor 233 is an example of a drive unit. The flash memory 242 is an example of a storage unit.

1-2. Operations

The operations of the camera system configured in the above-described manner will be described using FIGS. 2 to 4.

1-2-1. Example of the operations of the camera system

In the camera system 1, the interchangeable lens 200 has a synchronous mode in which the interchangeable lens 200 operates in synchronization with an exposure synchronizing signal received from the camera body 100 and an asynchronous mode in which the interchangeable lens 200 does not operate in synchronization with the exposure synchronizing signal (i.e., the interchangeable lens 200 operates at timing generated therein). It is determined as to whether the interchangeable lens 200 operates in the synchronous mode or the asynchronous mode, by the camera controller 140 according to a control state of the camera body 100.

Figure 2:
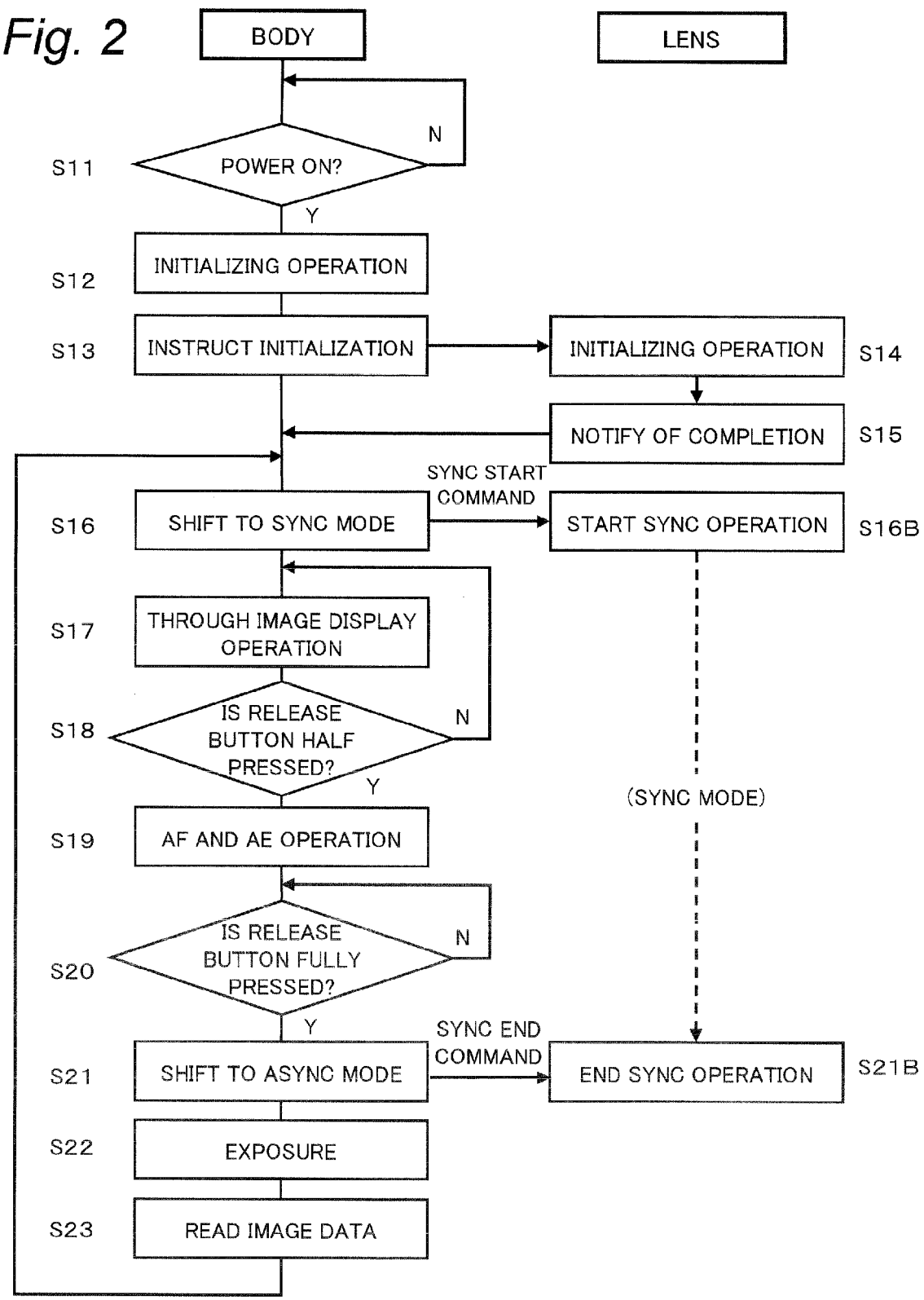
FIG. 2 is a flowchart for describing switching between a synchronous mode and an asynchronous mode.

FIG. 2 is a flowchart showing an exemplary operation of the camera system related to a switching operation between the aforementioned synchronous mode and asynchronous mode. With reference to the flowchart in FIG. 2, the operations of the camera controller 140 and the lens controller 240 in a switching operation between the synchronous mode and the asynchronous mode will be described.

With the camera system being powered off, if the power is switched to on by an operation by the user, and the like (S11), the camera controller 140 starts an initialization operation in the camera body 100 (S12) and instructs the interchangeable lens 200 to start an initialization operation (S13).

The lens controller 240 receives the instruction from the camera controller 140 and performs an initialization operation in the interchangeable lens 200 (S14). The initialization operation in the interchangeable lens 200 includes various operations that include, for example, measuring an origin of the operation of the focus motor 233, checking a value of a counter 243, and loading a program stored in the flash memory 242 into the DRAM 241. When the initialization operation in the interchangeable lens 200 is completed, the lens controller 240 notifies the camera controller 140 of the completion (S15).

When the initialization operation of the camera body 100 is completed and an initialization operation completion notification is received from the lens controller 240, the camera controller 140 shifts from the asynchronous mode to the synchronous mode (S16). When the camera controller 140 has shifted from the asynchronous mode to the synchronous mode, the camera controller 140 sends a synchronization start command to the lens controller 240. When the lens controller 240 receives the synchronization start command, the lens controller 240 shifts from the asynchronous mode to the synchronous mode and performs a control operation in synchronization with a synchronizing signal received from the camera controller 140 (S16B). For example, the lens controller 240 grasps drive states of the focus motor 233 and the diaphragm motor 261 in synchronization with the synchronizing signal and sends results thereof to the camera controller 140.

Thereafter, the camera controller 140 shifts to an operation to generate and display a through-image (S17). By thus performing a through-image generation and display operation after shifting to the synchronous mode, the camera controller 140 can properly grasp position information of the focus lens 230, an aperture value of the diaphragm 260, and the like, at predetermined timing. As a result, the camera system 1 can perform AF control and AE control more accurately. Note that the through-image display operation will be described in detail below.

During a period in which the generated through image is displayed on the liquid crystal display monitor 120, the camera controller 140 monitors whether the release button 130 is half-pressed (S18). If a half-press operation of the release button 130 is performed, then the camera controller 140 performs an autofocus operation and an automatic exposure control operation (S19). When those operations are completed, it is monitored whether a full-press operation of the release button 130 is performed (S20).

If a full-press operation of the release button 130 is performed, then the camera controller 140 shifts from the synchronous mode to the asynchronous mode (S21). When the camera controller 140 shifts from the synchronous mode to the asynchronous mode, the camera controller 140 sends a synchronization end command to the lens controller 240. When the lens controller 240 receives the synchronization end command, the lens controller 240 shifts to the asynchronous mode (S21B).

Thereafter, the CCD image sensor 110 performs exposure (S22). The camera controller 140 reads image data generated by the exposure from the CCD image sensor 110 and performs image processing on the image data (S23). When the reading of image data is completed and the generated image data is stored in the memory card 171, the control returns to step S16 and the camera controller 140 shifts to the synchronous mode. The reason why the camera controller 140 thus shifts to the asynchronous mode upon the start of capturing an image (upon full-press of the release button 130) is because during a period from when image data is captured until the image data is recorded in the memory card 171 the camera controller 140 only needs to control each processing unit in the camera body 100 (processing of the captured image data and recording of the image data in the memory card 171) and does not need to synchronize with the lens controller 240. Accordingly, the camera controller 140 can concentrate on processes in the camera body 100.

Note that when image data stored in the memory card 171 is reproduced and displayed on the liquid crystal display monitor 120, the camera controller 140 and the lens controller 240 are driven in the asynchronous mode. This is because upon a reproduction operation the camera controller 140 only needs to control each of processing units provided in the camera body 100 and does not need to control the processing units in the lens controller 240, and thus the camera controller 140 does not particularly need to synchronize with the lens controller 240. By not synchronizing with the lens controller 240 upon reproduction, the camera controller 140 can concentrate on the reproduction of image data. As a result, the camera controller 140 can perform an image data reproduction process at high speed. In addition, by driving in the asynchronous mode during reproduction, the CCD image sensor 110 can be turned off during the reproduction. This is because, since the camera controller 140 and the lens controller 240 are driven in the asynchronous mode, the camera controller 140 does not need to send a synchronizing signal to the lens controller 240. Therefore, since the CCD image sensor 110 is turned off during reproduction of image data, and the like, power saving can be achieved.

As described above, in the camera system of the present embodiment, when a full-press operation of the release button 130 is performed, the camera controller 140 shifts from the synchronous mode to the asynchronous mode. Therefore, when the camera controller 140 processes the captured image data, records the image data in the memory card 171, and the like, the camera body 100 and the interchangeable lens 200 are not particularly synchronized. Accordingly, the camera controller 140 can concentrate on a process of image data and recording of the image data in the memory card 171. As a result, the camera controller 140 can perform a process of image data and recording of the image data in the memory card 171 at high speed.

In the camera system according to the present embodiment, when image data recorded in the memory card 171 is reproduced, the camera controller 140 operates in the asynchronous mode. Therefore the camera controller 140 can concentrate on the reproduction of image data. As a result, the camera controller 140 can perform an image data reproduction process at high speed.

1-2-2. Switching from Asynchronous Mode to Synchronous Mode

When the camera controller 140 shifts from the asynchronous mode to the synchronous mode, the camera controller 140 transmits a synchronization start command to the lens controller 240. When the lens controller 240 receives the synchronization start command, the lens controller 240 performs a control operation in synchronization with an exposure synchronizing signal received from the camera controller 140. Specifically, the lens controller 240 grasps drive states of the focus motor 233 and the diaphragm motor 261 in synchronization with the exposure synchronizing signal and sends results thereof to the camera controller 140.

As described above, in the camera system of the present embodiment, the camera controller 140 switches between the synchronous mode and the asynchronous mode by sending the lens controller 240 a command. Accordingly, the control of the camera system is performed in the asynchronous mode when there is no need to synchronize and thus the control of the camera system can be simplified.

1-2-3. Switching from Synchronous Mode to Asynchronous Mode

When the camera controller 140 shifts from the synchronous mode to the asynchronous mode, the camera controller 140 transmits a synchronization end command to the lens controller 240. When the lens controller 240 receives the synchronization end command, the lens controller 240 performs a control operation while not synchronized with an exposure synchronizing signal received from the camera controller 140.

1-2-4. Operations in Synchronous Mode

Upon generating a through image or capturing a moving image, the camera controller 140 can select one of a manual focus mode, an autofocus mode, and a subject tracking mode, by an operation by the user. Furthermore, when the subject tracking mode is selected, the camera controller 140 can select either one of a low-speed tracking mode and a high-speed tracking mode, by an operation by the user. In the embodiment of the present invention, the case in which the user selects the subject tracking mode will be described. Note that the autofocus mode in this case is a mode in which the focus state of a subject image does not particularly change unless the release button 130 is half-pressed by the user.

In the case of the subject tracking mode, the camera controller 140 controls the lens controller 240 to move the focus lens 230 along the optical axis, according to movement of a subject. In the case of the subject tracking mode, to promptly grasp whether the subject is moving in a far direction or a near direction, the focus motor 233 drives the focus lens 230 to repeatedly move the focus lens 230 by a minute distance back and forth along the optical axis. Note that, in the high-speed tracking mode, the camera system 1 controls the interchangeable lens 200 to perform a wobbling operation at the highest frequency among wobbling frequencies supportable by the interchangeable lens 200. In the low-speed tracking mode, the camera system 1 controls the interchangeable lens 200 to perform a wobbling operation at a frequency that is a wobbling frequency supportable by the interchangeable lens 200 and is lower than the frequency used in the high-speed tracking mode.

During a wobbling operation period, the camera controller 140 obtains a position along the optical axis of the focus lens 230 from the lens controller 240 and obtains image data from the CCD image sensor 110 to calculate an AF evaluation value, and thereby calculates a next drive target position of the focus lens 230. The lens controller 240 controls the focus motor 233 according to the drive target position calculated by the camera controller 140. By repeating this operation, a wobbling operation is implemented.

While a wobbling operation is performed, the camera controller 140 needs to properly grasp a correlation between a position of the focus lens 230 and contrast of image data generated by the CCD image sensor 110. For this purpose, in order to precisely match timing of a position along the optical axis of the focus lens 230 with timing of exposure of an image on the CCD image sensor 110, the camera controller 140 transmits an exposure synchronizing signal to the lens controller 240. Accordingly, the lens controller 240 obtains a position of the focus motor and the camera controller 140 makes the CCD image sensor 110 perform an exposure operation, in synchronization with an exposure synchronizing signal.

When comparing the low-speed tracking mode and the high-speed tracking mode, in the case of the low-speed tracking mode, the drive sound of the focus motor 233 can be suppressed to a low level, and in the case of the high-speed tracking mode, trackability of movement of a subject can be enhanced.

1-2-4-1. Operations Synchronized with Exposure Synchronizing Signal

In the camera system of the present embodiment, the interchangeable lens 200 performs various operations in synchronization with an exposure synchronizing signal obtained from the camera body 100. For example, the interchangeable lens 200 performs drive control of the focus lens 230, the diaphragm 260, the zoom lens 210, and the OIS lens 220 in synchronization with the exposure synchronizing signal. Synchronous operations will be described below with reference to FIG. 3.

Figure 3:
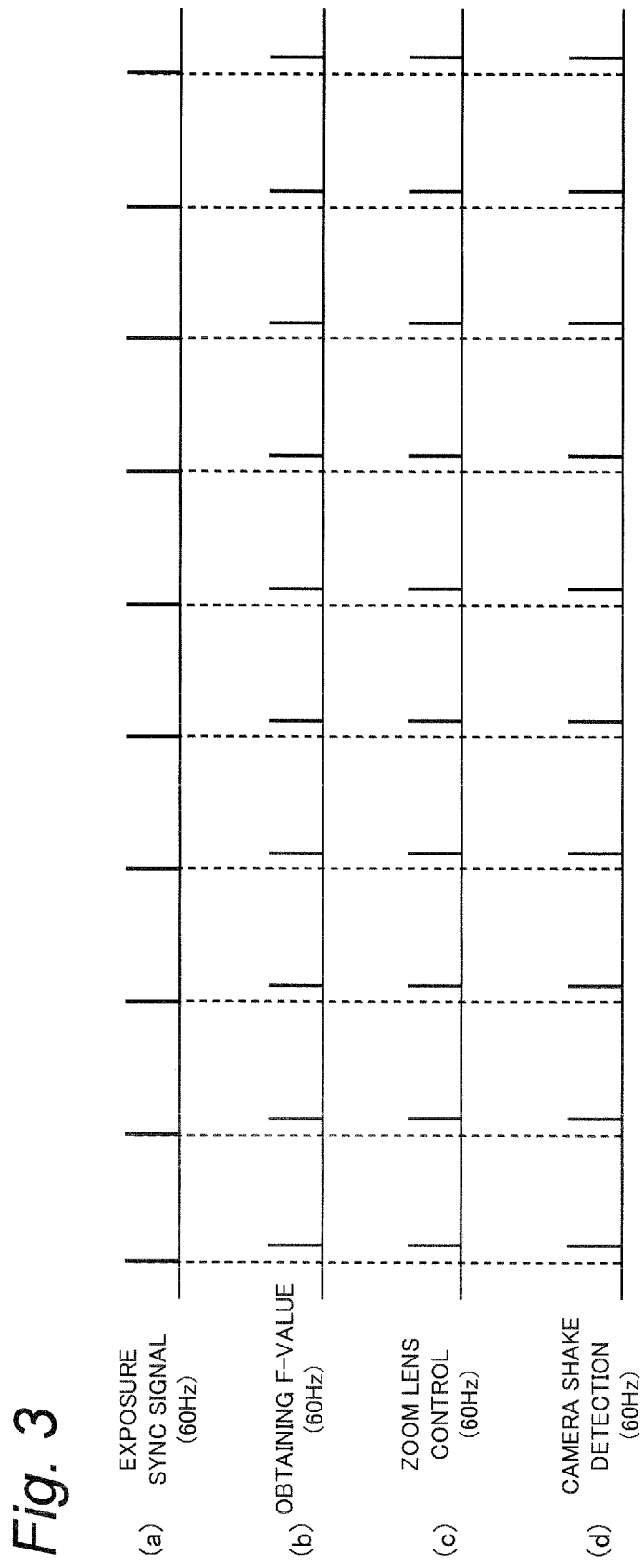
FIG. 3 is a timing chart for describing a synchronous state.

In the camera system of the first embodiment, the camera controller 140 sends an exposure synchronizing signal with a frequency of 60 Hz to the lens controller 240 (see FIG. 3($a$)).

The lens controller 240 obtains an F value in synchronization with the exposure synchronizing signal (see FIG. 3($b$)). The lens controller 240 can perform drive control of the diaphragm 260 according to the obtained F value.

In addition, the lens controller 240 obtains position information of the zoom lens 210 in synchronization with the exposure synchronizing signal (see FIG. 3($c$)).

In addition, the lens controller 240 detects a camera shake state when obtaining the exposure synchronizing signal (see FIG. 3($d$)). The lens controller 240 can perform drive control of the OIS lens 220 according to the detected camera shake state.

As described above, control of the diaphragm 260, the zoom lens 210, the OIS lens 220, and the like, by the lens controller 240 is performed in synchronization with an exposure synchronizing signal obtained by the lens controller 240 from the camera controller 140 and at 60 Hz which is the same frequency as the frequency of the exposure synchronizing signal.

1-2-4-2. Wobbling Operation

A wobbling operation which is implemented by performing drive control of the focus lens 230 during a synchronous period will be described with reference to FIGS. 4 and 5.

In the camera system 1 of the first embodiment, a wobbling operation of the focus lens 230 is performed in synchronization with an exposure synchronizing signal (see (a) of FIG. 5) obtained from the camera body 100. However, in the camera system 1, a frequency for a wobbling operation of the focus lens 230 does not always match a frequency of an exposure synchronizing signal obtained from the camera body 100.

Therefore, in order to synchronize operations between the camera body 100 and the interchangeable lens 200 even when the frequency of an exposure synchronizing signal is different from the frequency for a wobbling operation, the camera system 1 performs the following operations when making the focus lens 230 perform a wobbling operation.

Figure 4:
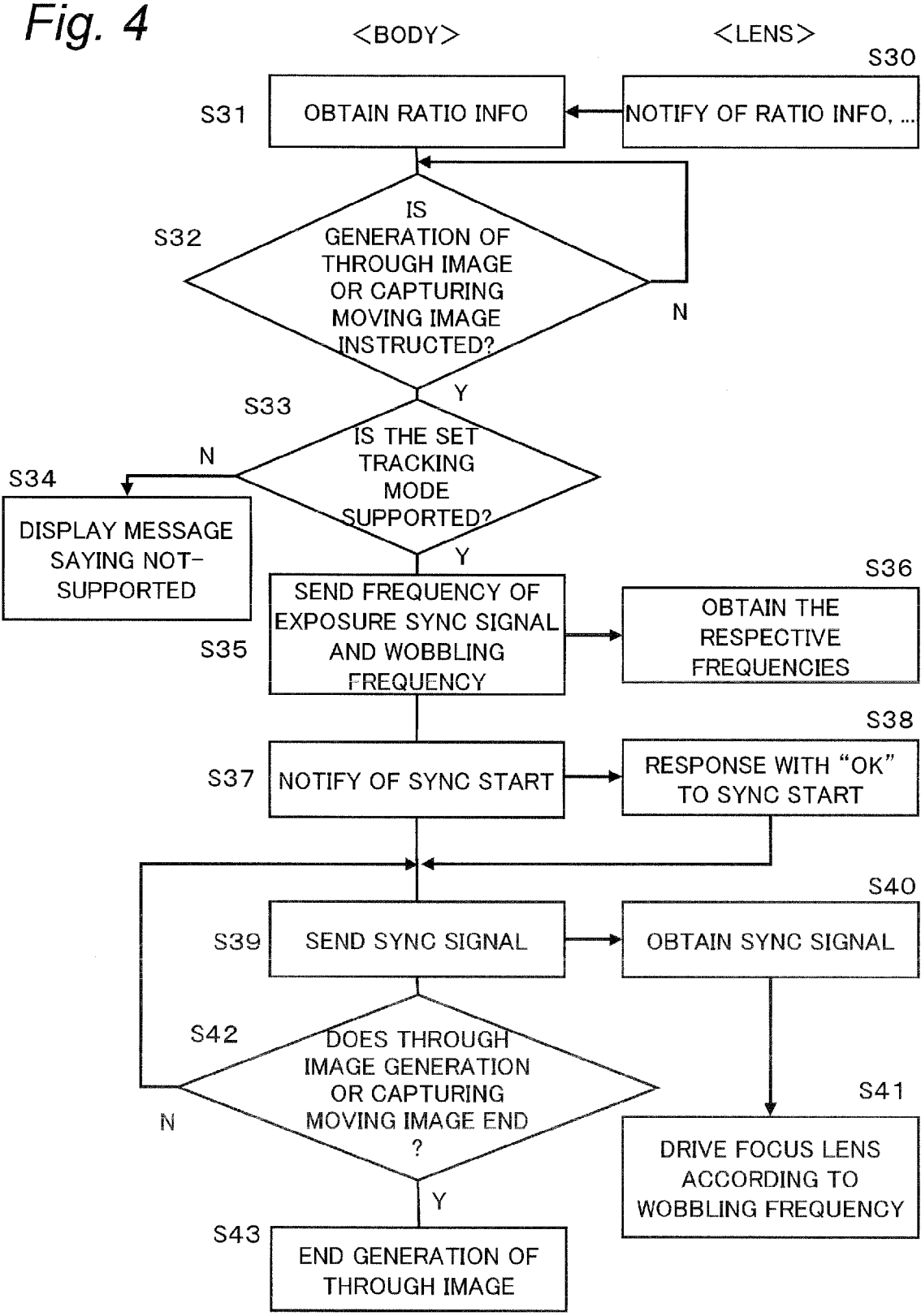
FIG. 4 is a flowchart for describing wobbling control.

Referring to FIG. 4, when the power of the camera system 1 is switched from OFF to ON, the camera system 1 performs an initialization operation. During the initialization operation, the interchangeable lens 200 notifies the camera body 100 of information about ratios of supportable frequencies to a frequency of an exposure synchronizing signal to be obtained and information about the supportable frequencies for a wobbling operation (S30).

When the camera body 100 obtains the information about ratios and the information about the supportable frequencies for a wobbling operation (S31), the camera controller 140 is on standby until receiving an instruction to generate a through image or an instruction to capture a moving image (S32). When receiving an instruction to generate a through image or an instruction to capture a moving image, the camera controller 140 determines, based on the information about the supportable frequencies for a wobbling operation which is obtained from the interchangeable lens 200, whether the focus lens 230 can perform a wobbling operation at a wobbling frequency defined by the tracking mode (S33) which is set.

If it is determined that the focus lens 230 cannot perform a wobbling operation at a wobbling frequency defined by the set tracking mode, then the camera controller 140 displays on the liquid crystal display monitor 120 that the set tracking mode cannot be supported (S34).

if it is determined that the focus lens 230 can perform a wobbling operation at a wobbling frequency defined by the set tracking mode, then the camera controller 140 sends, to the lens controller 240, information about a frequency of an exposure synchronizing signal to be sent from the camera controller 140 and information about a frequency used to make the focus lens 230 perform a wobbling operation (S35). The lens controller 240 receives the information (S36).

The camera controller 140 sends a synchronization start command to the lens controller 240 (S37). The lens controller sends a response to the synchronization start command to the camera controller (S38).

Thereafter, the camera controller 140 starts to send an exposure synchronizing signal using the frequency sent in advance, to the lens controller 240 (S39).

When the lens controller 240 receives the exposure synchronizing signal from the camera controller 140 (S40), the lens controller 240 issues a control command for the focus lens 230 in synchronization with the received exposure synchronizing signal, and performs drive control of the focus lens 230 (S41). This control command is a command to control the drive of the focus lens 230 such that the focus lens 230 performs a wobbling operation at a frequency specified by the camera controller 140.

For example, it is assumed that the frequency of an exposure synchronizing signal is 60 Hz (see FIG. 5(*a*)) and the frequency for a wobbling operation of the focus lens 230 is 30 Hz (the high-speed tracking mode, see FIG. 5(*b*)). In this case, the lens controller 240 issues a control command as shown in FIG. 5(*c*) to control the wobbling operation of the focus lens 230. In this case, the control command shown in FIG. 5(*c*) controls, as shown in FIG. 5(*d*), the drive of the focus lens 230 in units of sections, where one cycle (1/60 sec) of the synchronizing signal is divided into four sections.

Alternatively, for example, it is assumed that the frequency of an exposure synchronizing signal is 60 Hz (see FIG. 5 (*a*)) and the frequency for a wobbling operation of the focus lens 230 is 15 Hz (the low-speed tracking mode, see FIG. 5(*e*)). In this case, the lens controller 240 issues a control command as shown in FIG. 5(*f*) to control the wobbling operation of the focus lens 230. In this case, the control command shown in FIG. 5(*f*) controls, as shown in FIG. 5(*g*), the drive of the focus lens 230 in units of sections, where one cycle of the synchronizing signal is divided into four sections. Note that the orientations of arrows described in the commands shown in FIG. 5(*d*) and FIG. 5(*g*) represent the drive directions of the focus lens 230 in the respective sections by the command. Specifically, the up or down arrow represents the movement of the focus lens 230 to the near side or far side relative to the camera body and the horizontally-oriented arrow represents the stop of the focus lens 230.

The camera controller 140, after sending an exposure synchronizing signal to the lens controller 240, determines whether to terminate the generation of a through image or the capturing of a moving image (S42). The case of terminating the generation of a through image includes a case in which the release button 130 is full-pressed by the user to perform an image data recording operation, a case in which an instruction to terminate a live view mode (terminate the generation of a through image) is provided by the user, and the like.

When not shifting to an operation of terminating the generation of a through image or the capturing of a moving image, the camera controller 140 continuously sends the exposure synchronizing signal to the lens controller 240. When shifting to an operation of terminating the generation of a through image or the capturing of a moving image, the camera controller 140 stops sending the exposure synchronizing signal to the lens controller 240 to terminate the generation of a through image or the capturing of a moving image (S42).

As described above, the camera system 1 according to the present embodiment adopts a configuration in which, while an exposure synchronizing signal is generated at a fixed frequency, wobbling control of the focus lens 230 is performed at a frequency different from the frequency of the exposure synchronizing signal. With this configuration, while the camera system 1 synchronize various drives between the camera body 100 and the interchangeable lens 200 at a frequency of an exposure synchronizing signal, the camera system 1 can control a wobbling operation of the focus lens 230 at a frequency different from the frequency of the exposure synchronizing signal. As a result, the camera system 1 can make the focus lens 230 perform a wobbling operation at a frequency suitable for the wobbling operation and can synchronize various drives using an exposure synchronizing signal with a fixed frequency.

Moreover, in the camera system 1 according to the present embodiment, the flash memory 242 stores information about supportable driving cycles of a wobbling operation and information about ratios of supportable wobbling operation frequencies to a frequency of an exposure synchronizing signal to be obtained. The information about driving cycles and the information about ratios are sent to the camera body 100 at an initialization stage. The camera controller 140 determines a frequency used for a wobbling operation of the focus lens 230, from the information about driving cycles, the ratio information, and a frequency of an exposure synchronizing signal. With this, even when one of interchangeable lenses that can support different wobbling operation frequencies respectively is mounted to the camera body 100, the camera body 100 can accurately control the interchangeable lens.

Moreover, in the camera system 1 according to the present embodiment, information about supportable driving cycles of a wobbling operation which is stored in the flash memory 242 is information indicating a ratio of driving cycle that can be available to a wobbling operation to a cycle of an exposure synchronizing signal. Therefore, regardless of the frequency of an exposure synchronizing signal, under a fixed constraint, i.e., a ratio, a wobbling operation can be performed at a frequency different from the frequency of the exposure synchronizing signal.

1-3. Summary of the Present Embodiment

A camera system of the present embodiment includes a camera body 100 and an interchangeable lens 200. The camera body 100 includes a CCD image sensor 110 that captures a subject image formed by the interchangeable lens 200 in a predetermined capturing cycle and can thereby generate image data as a moving image; a camera controller 140 that generates an exposure synchronizing signal in a cycle (first cycle) correlated with the capturing cycle; and a body mount 150 that sends the exposure synchronizing signal to the interchangeable lens 200. The camera controller 140 further sends information indicating a cycle (second cycle) different from the cycle (first cycle) of the exposure synchronizing signal to the interchangeable lens 200 through the body mount 150. The interchangeable lens 200 includes a focus lens 230; a focus motor 233 that drives the focus lens 230 along an optical axis; a lens mount 250 that receives the exposure synchronizing signal and the information indicating the second cycle which are sent from the camera controller 140; and a lens controller 240 that controls an operation of the interchangeable lens. The lens controller 240 controls the focus motor 233 in the second cycle to perform minute back and forth driving which minutely drives the focus lens 230 back and forth along the optical axis, and performs control different from the minute back and forth driving in the interchangeable lens, in the first cycle.

With this configuration, while the camera system 1 synchronizes various drives between the camera body 100 and the interchangeable lens 200 at a frequency of an exposure synchronizing signal, the camera system 1 can control a wobbling operation of the focus lens 230 at a frequency different from the frequency of the exposure synchronizing signal. As a result, the camera system 1 can control a wobbling operation of the focus lens 230 at a frequency suitable for wobbling.

In the camera system according to the present embodiment, the interchangeable lens 200 may store in advance in a flash memory 242 cycle information about a driving cycle that is supported for the minute back and forth driving. The cycle information stored in the flash memory 242 may be sent to the camera body 100. The camera controller 140 may specify the second cycle by referring to the cycle information received from the body mount 150.

With this configuration, even when one of interchangeable lenses that can support wobbling operations at different frequencies is mounted to the camera body 100, the camera body 100 can accurately control the interchangeable lens.

In addition, in the camera system according to the present embodiment, the cycle information stored in the flash memory 242 may be information indicating a ratio of a driving cycle that can be accommodated upon the minute back and forth drive to the cycle of the synchronizing signal.

With this configuration, regardless of the frequency of an exposure synchronizing signal, under a fixed constraint, i.e., a ratio, a wobbling operation can be performed at a frequency different from the frequency of the exposure synchronizing signal.

2. Other Embodiments

Although in the camera system 1 of the first embodiment the frequency of an exposure synchronizing signal is 60 Hz, the frequency is not limited thereto. The frequency of an exposure synchronizing signal may be, for example, 30 Hz or 15 Hz and any frequency can be set.

In the camera system 1 of the first embodiment, information about ratios of wobbling frequencies controllable by the lens controller 240 to a frequency of an exposure synchronizing signal and information about the controllable wobbling frequencies are stored in the flash memory 242 of the interchangeable lens. However, the configuration is not limited thereto, and frequencies of an exposure synchronizing signal supportable by the interchangeable lens and information about ratios of wobbling frequencies supportable by the interchangeable lens to the frequencies of the exposure synchronizing signal may be stored in the flash memory 242. FIG. 6 shows an example thereof. FIG. 6 shows control frequency support flags as information indicating control frequencies and wobbling frequencies which are supportable by the interchangeable lens. Such control frequency support flags may be sent to the camera body 100 from the interchangeable lens 200 as lens data. The control frequency support flags are composed of 15 bits and each bit composes a flag. The 1st to 12th bits are flags indicating whether the interchangeable lens 200 can support control frequencies associated with the respective flags. The 13th to 15th bits are flags indicating whether the interchangeable lens 200 can perform a wobbling operation at frequencies that are $1/n$ (n=2, 4, and 8) of a supportable control frequency. In any of the flags, the value thereof being 1 indicates "supported" and 0 indicates "not supported". For example, when the value of a 60 Hz control frequency support flag at the 2nd bit and the value of a wobbling frequency×½ support flag at the 13th bit are both 1, it indicates that the interchangeable lens 200 can be driven at a control frequency of 60 Hz and can perform a wobbling operation at a frequency (30 Hz) that is ½ of the control frequency. In this case, the wobbling frequency×the $1/n$ wobbling frequency support flags (n=2, 4, and 8) at the 13th to 15th bits correspond to driving frequency information.

In addition, frequencies of an exposure synchronizing signal which are supportable by the interchangeable lens and information about ratios of wobbling frequencies supportable by the interchangeable lens for the respective frequencies may be stored in the flash memory 242. In this manner, a combination of a frequency of an exposure synchronizing signal and a wobbling frequency which are supportable by the interchangeable lens can be more finely defined.

Moreover, although the camera system 1 of the first embodiment has the low-speed tracking mode and the high-speed tracking mode as the tracking mode, the configuration is not necessarily limited thereto. The camera system 1 may only have the low-speed tracking mode or may only have the high-speed tracking mode. Alternatively, the camera system 1 may have a mode such as a middle-speed tracking mode in addition to the low-speed tracking mode and the high-speed tracking mode. In a word, the camera system 1 may have any tracking mode and may have several types of tracking modes.

Moreover, in the first embodiment the camera system 1 of is configured such that, when the camera system 1 can not support the set tracking mode, display indicating that the set tracking mode cannot be supported is provided on the liquid crystal display monitor 120. However the configuration is not necessarily limited thereto. For example, wobbling control of the focus lens 230 may be performed at a driving frequency closest to a driving frequency defined by the set tracking mode among the supportable wobbling frequencies.

Moreover, in the camera system 1 according to the first embodiment, the camera controller 140 specifies to the lens controller 240 a frequency used to cause the focus lens 230 to perform a wobbling operation. However the configuration is not necessarily limited thereto. The camera controller 140 may send to the lens controller 240 a synchronizing signal with a frequency equivalent to a wobbling frequency used for the focus lens 230. With this configuration, wobbling control of the focus lens 230 and control of other members in the interchangeable lens 200 can be made completely independent of each other and thus synchronization frequencies for respective operations can be easily separated.

Moreover, the camera system 1 of the first embodiment is configured such that the drive of the focus lens 230 is controlled with a section that corresponds to one cycle of an exposure synchronizing signal being divided into four sections. However the configuration is not necessarily limited thereto. For example, the drive of the focus lens 230 may be controlled with one cycle being divided into five sections or the drive of the focus lens 230 may be controlled with one cycle being divided into eight sections. In a word, the drive of the focus lens 230 may be controlled with any number of divided sections.

Moreover, in the camera system 1 of the first embodiment, when a wobbling operation of the focus lens 230 is performed, a wobbling operation is performed in which the movement path of the lens has a trapezoidal wave form. However the configuration is not necessarily limited thereto. For example, a wobbling operation may be performed in which the movement path of the lens has a triangular wave form. In a word, any wobbling operation may be performed as long as the operation is such that the focus lens 230 minutely moves back and forth along the optical axis.

Although a configuration including the zoom lens 210 and the CIS lens 220 is exemplified in the first embodiment, they are not essential components. That is, the idea of the first embodiment can also be applied to a camera system in which a single focus lens having no zoom function is mounted and can also be applied to a camera system in which an interchangeable lens having no camera shake correction function is mounted.

Although a camera body with no movable mirror is exemplified in the first embodiment, the configuration of the camera body is not limited thereto. For example, a movable mirror may be included in the camera body or a prism for splitting a subject image may be included in the camera body. Alternatively, the configuration may be such that a movable mirror is included in an adapter instead of in the camera body.

Although the CCD image sensor 110 is exemplified as an imaging device in the first embodiment, the imaging device is not limited thereto. For example, the imaging device may be configured by a CMOS image sensor or NMOS image sensor.

Although specific embodiments have been described above, many other variants, modifications, and other uses are obvious to those skilled in the art. Therefore, the present invention is not limited to the specific disclosure made herein and can only be limited by the appended claims. Note that the present application relates to Japanese Patent Application No. 2008-141928 (filed May 30, 2008) and U.S. Provisional Patent Application Ser. No. 61/053,815 (filed May 16, 2008), the contents of which are incorporated herein by reference.

INDUSTRIAL APPLICABILITY

The present invention can be applied to lens interchangeable type camera systems. Specifically, the present invention can be applied to digital still cameras, digital movie cameras, and the like.

DESCRIPTION OF THE REFERENCE NUMERALS

100: Camera body
110: CCD image sensor
111: AD converter
112: Timing generator
120: Liquid crystal display monitor
130: Release button
140: Camera controller
141: DRAM
150: Body mount
160: Power supply
170: Card slot
171: Memory card
200: Interchangeable lens
210: Zoom lens
211: Drive mechanism
212: Detector
220: OIS lens
221: Actuator
222: Position detection sensor
223: OIS IC
230: Focus lens
233: Focus motor
240: Lens controller
241: DRAM
242: Flash memory
243: Counter
250: Lens mount
260: Diaphragm
261: Diaphragm motor

The invention claimed is:

1. A camera system comprising a camera body and an interchangeable lens, wherein
the camera body comprises:
an imaging unit that captures a subject image formed by the interchangeable lens in a predetermined capturing cycle to generate image data;
a body controller that generates a synchronizing signal having a first cycle correlated with the capturing cycle; and
a sending unit that sends the generated synchronizing signal to the interchangeable lens,
the body controller further sending information indicating a second cycle to the interchangeable lens through the sending unit, the second cycle is larger than the first cycle and the second cycle is an integral multiple of the first cycle, and
the interchangeable lens comprises:
a focus lens;
a drive unit that drives the focus lens along an optical axis;
a receiving unit that receives the synchronizing signal and the information indicating the second cycle which are sent from the camera body; and
a lens controller that controls an operation of the interchangeable lens,
the lens controller controlling the drive unit to perform, in the second cycle, an autofocus control for capturing a moving image which periodically and minutely moves the focus lens back and forth along the optical axis, and performing other control in the first cycle in the interchangeable lens than the autofocus control.

2. The camera system according to claim 1, wherein
the interchangeable lens further comprises a storage unit that stores, in advance, cycle information about a driving cycle of the autofocus control, which is supportable by the interchangeable lens, and
the body controller receives the cycle information from the interchangeable lens and sets the second cycle by referring to the received cycle information.

3. The camera system according to claim 2, wherein the cycle information is information indicating a ratio of a driving cycle which is supportable in the autofocus control to the cycle of the synchronizing signal.

4. The camera system according to claim 3, wherein the ratio is at least any one of ½, ¼, and ⅛.

5. A camera system comprising a camera body and an interchangeable lens, wherein
the camera body includes:
an imaging unit that captures a subject image formed by the interchangeable lens in a predetermined capturing cycle to generate image data;
a body controller that generates a first synchronizing signal having a first cycle correlated with the capturing cycle; and
a sending unit that sends the generated synchronizing signal to the interchangeable lens,
the body controller further generating a second synchronizing signal having a second cycle and sending the second synchronizing signal to the interchangeable lens, the second cycle is larger than the first cycle and the second cycle is an integral multiple of the first cycle, and
the interchangeable lens comprises:
a focus lens;
a drive unit that drives the focus lens along an optical axis;
a receiving unit that receives the first and the second synchronizing signals sent from the camera body; and
a lens controller that controls an operation of the interchangeable lens,
the lens controller controlling the drive unit to perform, in the second cycle, an autofocus control for capturing a moving image which periodically and minutely moves a position of the focus lens back and forth along the optical axis, and performing other control in the first cycle in the interchangeable lens than the autofocus control.

6. A camera body to which an interchangeable lens is mountable, comprising:
an imaging unit that captures a subject image formed by the interchangeable lens in a predetermined capturing cycle to generate image data;
a body controller that generates a synchronizing signal having a first cycle correlated with the capturing cycle; and
a sending unit that sends the generated synchronizing signal to the interchangeable lens, wherein
the body controller further sends information indicating a second cycle to the interchangeable lens through the sending unit, the second cycle is larger than the first cycle, the second cycle is an integral multiple of the first cycle, and the second cycle being a cycle used for an autofocus control for capturing a moving image which periodically and minutely moves the focus lens back and forth along an optical axis and being different from the first cycle.

7. The camera body according to claim 6, wherein the body controller receives cycle information about a driving cycle of the autofocus control which is supportable by the interchangeable lens from the interchangeable lens and sets the second cycle by referring to the received cycle information.

8. An interchangeable lens mountable to a camera body, comprising:
a focus lens;
a drive unit that drives the focus lens along an optical axis;
a receiving unit that receives a synchronizing signal having a first cycle and information indicating a second cycle which are sent from the camera body, the second cycle is larger than the first cycle and the second cycle is an integral multiple of the first cycle; and
a lens controller that controls an operation of the interchangeable lens, wherein
the lens controller controlling the drive unit to perform, in the second cycle, an autofocus control for capturing a moving image which periodically and minutely moves the focus lens back and forth along the optical axis, and performing other control in the first cycle in the interchangeable lens than the autofocus control.

9. The interchangeable lens according to claim 8, further comprising a storage unit that stores in advance cycle information about a driving cycle of the autofocus control, which is supportable by the interchangeable lens.

10. The camera system according to claim 1, wherein
the camera body has two subject tracking modes which control the lens controller to move the focus lens according to movement of a subject, including a low-speed tracking mode which moves the focus lens according to the movement of a subject with a lower speed and a high-speed tracking mode which moves the focus lens according to the movement of a subject with a higher speed, and
the body controller changes the second cycle according to the low-speed or high-speed tracking mode which is set to the camera body.

11. The camera system according to claim 5, wherein
the camera body has two subject tracking modes which control the lens controller to move the focus lens according to movement of a subject, including a low-speed tracking mode which moves the focus lens according to the movement of a subject with a lower speed and a high-speed tracking mode which moves the focus lens according to the movement of a subject with a higher speed, and
the body controller changes the second cycle according to the low-speed or high-speed tracking mode which is set to the camera body.

12. The camera body according to claim 6, wherein
the camera body has two subject tracking modes which control the lens controller to move the focus lens according to movement of a subject, including a low-speed tracking mode which moves the focus lens according to the movement of a subject with a lower speed and a high-speed tracking mode which moves the focus lens according to the movement of a subject with a higher speed, and
the body controller changes the second cycle according to the low-speed or high-speed tracking mode which is set to the camera body.

* * * * *